(12) United States Patent
Brederlow et al.

(10) Patent No.: US 7,817,037 B2
(45) Date of Patent: Oct. 19, 2010

(54) ELECTRONIC COMPONENT WITH ID TAGS

(75) Inventors: Ralf Brederlow, München (DE); Sylvain Briole, Hanau (DE); Christian Pacha, München (DE); Roland Thewes, Gröbenzell (DE); Werner Weber, München (DE)

(73) Assignee: Infineon Technologies AG, Neubiberg (DE)

(*) Notice: Subject to any disclaimer, the term of this patent is extended or adjusted under 35 U.S.C. 154(b) by 218 days.

(21) Appl. No.: 10/562,458

(22) PCT Filed: Jun. 30, 2004

(86) PCT No.: PCT/DE2004/001374
§ 371 (c)(1),
(2), (4) Date: Jun. 29, 2006

(87) PCT Pub. No.: WO2005/004046
PCT Pub. Date: Jan. 13, 2005

(65) Prior Publication Data
US 2007/0085582 A1 Apr. 19, 2007

(30) Foreign Application Priority Data
Jul. 1, 2003 (DE) ............................... 103 29 655

(51) Int. Cl.
*G08B 13/14* (2006.01)
*H03K 7/08* (2006.01)
(52) U.S. Cl. .................................... 340/572.1; 327/176
(58) Field of Classification Search .............. 340/572.1; 327/176
See application file for complete search history.

(56) References Cited

U.S. PATENT DOCUMENTS
4,712,153 A * 12/1987 Marget et al. .............. 361/91.6

(Continued)

FOREIGN PATENT DOCUMENTS
GB 2 165 423 9/1984

(Continued)

OTHER PUBLICATIONS

"Powder LSI: An Ultra Small RF Identification Chip for Individual Recognition Applications", Mitsuo Usami, et al., IEEE International Solid-State Circuits Conference, 2003 (10 pgs).

(Continued)

*Primary Examiner*—Daniel Wu
*Assistant Examiner*—John F Mortell
(74) *Attorney, Agent, or Firm*—Dicke, Billig & Czaja, PLLC

(57) ABSTRACT

The invention relates to an electronic component that can be operated by means of an alternating voltage. Said component includes at least one input, at least one output and a pair of electronic sub-components with an identical function. The input(s) of the electronic component is/are coupled to a respective input of the electronic sub-components with an identical function and the output(s) of the electronic component is/are coupled to a respective output of said electronic sub-components. In addition, the electronic component is configured in such a way that at least one output only one output signal of the first sub-component of the pair of functionally identical electronic components can be picked up during a first half-wave of an alternating voltage, whereas only one output signal of the second sub-component of the pair of functionally identical electronic can be picked up during the second half-wave of the alternating voltage.

21 Claims, 5 Drawing Sheets

U.S. PATENT DOCUMENTS

| | | | |
|---|---|---|---|
| 5,701,093 A * | 12/1997 | Suzuki | 326/98 |
| 5,731,691 A * | 3/1998 | Noto | 323/220 |
| 5,769,051 A * | 6/1998 | Bayron et al. | 123/335 |
| 5,870,031 A * | 2/1999 | Kaiser et al. | 340/10.34 |
| 5,986,476 A * | 11/1999 | De | 326/98 |
| 6,229,349 B1 | 5/2001 | Franckart et al. | |
| 6,329,808 B1 * | 12/2001 | Enguent | 324/76.77 |
| 6,693,511 B1 * | 2/2004 | Seal | 340/10.1 |
| 2003/0102961 A1 | 6/2003 | Fischer et al. | |
| 2004/0119504 A1 * | 6/2004 | Baude et al. | 326/104 |

FOREIGN PATENT DOCUMENTS

WO    WO 00/64004    10/2000

OTHER PUBLICATIONS

CCG Germany European Article No. (EAN) 13 Standard, Wikipedia, the Free Encyclopedia, 3 pp. (Aug. 21, 2007, <http://en.wikipedia.org/wiki/European_Article_Number>.

* cited by examiner

Start: CLK=0 & Q=0

ELECTRONIC COMPONENT WITH ID TAGS

CROSS REFERENCE TO RELATED APPLICATIONS

This Utility Patent Application claims the benefit of the filing date of Application No. DE 103 29 655.7, filed Jul. 1, 2003 and International Application No. PCT/DE2004/001374, filed Jun. 30, 2004, both of which are herein incorporated by reference.

BACKGROUND

One embodiment of the invention creates an electronic component with at least one pair of functionally identical electronic sub-components.

Electronic components are today used in many areas. One field of use, for example, is the field of ID tags. The ID tags are normally used in arrangements for identifying or locating people, objects or animals. This is done for a large number of purposes, for example in access control systems, inventory management, materials management, production automation etc.

The arrangements generally include a transponder unit and a base station. The ID tags are normally read without direct contact between the transponder unit and the base station i.e. by means of radio transmission for example. Important criteria for specifying such an ID tag are, for example, the operating range i.e. the distance range within which the ID tag can be read, and the dependence on the read position i.e. how exactly the ID tag must be directed towards the base station (read device). Additional criteria for the ID tag are a sufficient data storage capacity and the manufacture price. Generally speaking, in order to make ID tags easier to use, the aim is to manufacture ID tags having as large an operating range as possible and as small a dependence on read position as possible. The data storage capacity should be large enough for it to be possible to differentiate between two products within a supermarket, for example, by means of the information stored on the ID tag. For instance, the German EAN 13 code (CCG Germany EAN 13 standard), which employs 52 bits, can be used for this. In addition, one should note that for many applications, for example for the application as individual product identification in supermarkets, the manufacture costs of the ID tags should be as low as possible.

Radio frequency ID (RFID) systems have emerged as the most effective non-contact automatic ID systems to date. In the radio frequency sector, passive RFID tags, as they are known, are mostly used in order to achieve minimum manufacture costs. They have no battery and provide a high degree of flexibility and reliability. In addition, they also need only little or no maintenance at all.

Passive RFID tag systems generally have two parts: a read device also called the reader, and a passive ID tag. The ID tag normally includes an antenna coil as input and/or output in the form of either a wound or a printed antenna coil, and a semiconductor chip having an integrated rectifier circuit and additional front-end elements that may be simple modulation circuits or non-volatile memories for example. The ID tag is supplied with energy by means of a time varying radio frequency wave, which is generated and transmitted by the reader. This radio frequency signal is also called a carrier signal or carrier. When the electromagnetic field passes through the antenna coil, the flux change of the magnetic field through the coil induces an AC voltage in the coil. This AC voltage is rectified and used as the power source for the ID tag. When power transmitted by means of a reader is available in the ID tag, the information stored in the ID tag is transmitted to the reader.

The transmission of the information between the reader and the ID tag is based on the modulation of the electromagnetic field generated by a coil of the reader. By repeated parallel connection of the ID tag coil, i.e. coupling as an inductive load, by means of a transistor, the ID tag can cause slight fluctuations in the electromagnetic field of the carrier wave of the reader. The electromagnetic coupling between ID tag and reader is essentially behaving like a transformer. When the coil of the ID tag, which can be regarded as a secondary winding, is briefly connected in parallel, the coil of the reader, which can be regarded as a primary winding, experiences a brief voltage drop i.e. amplitude modulation of the electromagnetic field transmitted by the reader. This is often referred to as backscatter. By detecting this backscatter signal, the information stored in the ID tag can be received and identified in full in the reader. This amounts to bi-directional communication between the reader and the ID tag.

This amplitude modulation of the electromagnetic field of the reader provides a communication path back to the reader. The data bits, i.e. the data stored in the ID tag and transmitted to the reader, can be encoded in a number of different ways or further modulated.

The electromagnetic field generated by the ID tag reader serves more than one purpose. First, it is used to induce sufficient energy in the coil of the ID tag for the ID tag to be supplied with enough power. Second, it provides a synchronisation clock for the ID tag. Third, the electromagnetic field is used as the carrier wave for transmitting to the reader the information stored in the ID tag.

The typical procedure, known as "handshaking", for establishing and checking a communication link between an ID tag and a reader is as follows:

The reader generates a continuous sinusoidal radio frequency carrier wave, constantly checking whether this carrier wave is being modulated. Detected modulation of the carrier wave, or in other words of the electromagnetic field, indicates the presence of an ID tag.

An ID tag enters the radio frequency field generated by the reader. As soon as the ID tag has absorbed enough energy to function correctly, it modulates the carrier wave and hence begins to clock to an output transistor, i.e. to transmit synchronously, the data stored in the ID tag. Normally the output transistor switches the antenna coil of the ID tag.

The output transistor of the ID tag connects, depending on the data stored in the ID tag, the antenna coil in parallel, i.e. the antenna coil of the ID tag is coupled inductively to the reader as a load, whereby the data is read synchronously from the memory of the ID tag.

The parallel connection of the antenna coil of the ID tag causes a brief fluctuation (attenuation) of the carrier wave, which can be detected as a slight change in the amplitude of the carrier wave.

The reader detects the amplitude modulated data and processes the resulting bit stream according to the coding and data modulation technique that was used.

The amplitude modulation of the electromagnetic field of the reader provides a communication path back to the reader. The data bits, i.e. the data stored in the ID tag and transmitted to the reader, can be encoded in a number of different ways or further modulated.

Although all the data is transmitted to the reader by backscatter modulation as described above, the actual modulation of the individual data bits is implemented as a "1" and a "0" by means of the direct modulation technique.

In direct modulation, a "high-level" in the envelope of the carrier wave is evaluated as a "1" and a "low-level" as a "0". This direct modulation can produce a high data rate, but provides only a low noise immunity.

The state of the art described here, as described in An Ultra Small RF Identification Chip for Individual Recognition Applications, Mitsuo Usami, et al., IEEE International Solid-State Circuits Conference (2003), Session 22.7 for example, has many disadvantages.

For example, the ID tag requires a relatively large surface area, because many electronic components, for example a rectifier circuit, must be arranged on the chip of the ID tag. This rectifier circuit not only requires surface area but also consumes power. This increases costs and degrades the cost/surface-area ratio. It also has complex geometry, one reason for this being a mix of components for different voltage supplies. In addition, this mix also results in power losses in the conversion from AC voltage to DC voltage or vice versa. In addition, the relatively high complexity of the ID tag also makes it impossible for this type of architecture to be implemented on other lower-cost substrates such as polymers.

An interrogator system having a passive label is known from GB 2 165 423 and includes an interrogator for transmitting interrogation signals, one or more labels or passive transponders which produce a reply signal containing coded information in response to the interrogation signal, and a receiver and decoder for receiving and decoding the information contained in it.

A receive/backscatter arrangement for implementing non-contact data transmission is known from US 2003/0102961 and includes an integrated circuit having two antennas, three capacitors connected in series between the two antennas, the center capacitor being a MOS varactor, a controllable, variable voltage source switched via the MOS varactor, and a control unit that controls the voltage source.

SUMMARY

One embodiment of the invention provides an electronic component, an ID tag and an ID tag/reader arrangement that are cheaper to manufacture, and in which the electronic component has an improved cost-to-surface-area ratio.

In one embodiment, an electronic component that can be operated by means of an AC voltage includes at least one input, at least one output and a pair of functionally identical electronic sub-components. The at least one input of the electronic component is connected to a respective input of the two functionally identical electronic sub-components. The at least one output of the electronic component is connected to a respective output of the two functionally identical electronic sub-components. The electronic component is configured in such a way that at the at least one output only one output signal of a first sub-component of the pair of functionally identical electronic sub-components can be picked up during a first half-wave of an AC voltage, whereas only one output signal of the second sub-component of the pair of functionally identical electronic sub-components can be picked up during the second half-wave of the AC voltage.

In one embodiment, an ID tag includes an electronic component that can be operated by means of an AC voltage, includes at least one input, at least one output and a pair of functionally identical electronic sub-components, wherein the at least one input of the electronic component is connected to a respective input of the two functionally identical electronic sub-components, and wherein the at least one output of the electronic component is connected to a respective output of the two functionally identical electronic sub-components. In addition, the electronic component is configured in such a way that at the at least one output only one output signal of a first sub-component of the pair of functionally identical electronic sub-components can be picked up during a first half-wave of an AC voltage, whereas only one output signal of the second sub-component of the pair of functionally identical electronic sub-components can be picked up during the second half-wave of the AC voltage.

In one embodiment, an arrangement includes a read device and an ID tag having an electronic component that can be operated by means of an AC voltage and includes at least one input, at least one output and a pair of functionally identical electronic sub-components. The at least one input of the electronic component is connected to a respective input of the two functionally identical electronic sub-components. The at least one output of the electronic component is connected to a respective output of the two functionally identical electronic sub-components. In addition, the electronic component is configured in such a way that at the at least one output only one output signal of a first sub-component of the pair of functionally identical electronic sub-components can be picked up during a first half-wave of an AC voltage, whereas only one output signal of the second sub-component of the pair of functionally identical electronic sub-components can be picked up during the second half-wave of the AC voltage. In addition, the read device and the ID tag are configured such that they can communicate with each other without contact.

In one embodiment, electronic sub-components, also referred to below as a function block, which are arranged in an electronic component, are provided in functionally identical pairs. A first electronic sub-component of a pair is operated during a first half-wave, i.e. by one polarity of an AC voltage, while the second electronic sub-component of the pair is operated during the second half-wave, i.e. by the other polarity, of the AC voltage. This means that an electronic sub-component of a pair is configured such that it can be operated by the positive part of an AC voltage, whereas the other electronic sub-component of a pair is configured such that it can be operated by the negative part of an AC voltage.

By arranging functionally identical electronic sub-components in pairs, it is possible to economise on the rectifier circuit necessary in the state of the art. This both saves the space of the rectifier circuit in the electronic component, and avoids the losses in converting an AC voltage into a DC voltage. Although each electronic sub-component is duplicated, which increases the required space, the saving from the rectifier circuit over-compensates for this increased space requirement of the electronic component.

Alternative embodiments of the electronic component also apply to the ID tag according to the invention and to the arrangement including a read device and an ID tag according to the invention, and vice versa.

In one embodiment, the electronic component includes a plurality of pairs of functionally identical electronic sub-components.

Various and complex applications of the electronic component can be realised by arranging a plurality of pairs of functionally identical electronic sub-components.

In a development of the electronic component, at least one pair of functionally identical electronic sub-components is a pair of logic gates, a pair of inverters and/or a pair of flip-flops.

Any logic gates, inverters and flip-flops known in the state of the art can be used here.

In one embodiment, the electronic component to include a coil.

In one case, the coil can act as a load that can be inductively coupled to an external device connected without contact, and can also be used for the inductive coupling of the AC voltage by an electromagnetic field generated by the external device.

In one case, the electronic component can include a voltage limiter, which limits the voltage lying across an electronic sub-component of the pair of functionally identical electronic sub-components.

The voltage limiter can ensure that the voltage lying across an electronic sub-component does not exceed a certain value which could destroy the electronic sub-component. This can be advantageous when the electrical component is used in an RFID tag, because in this case the AC voltage induced in the coil may not be constant as it is determined, amongst other factors, by the distance between reader and RFID tag, which normally cannot be kept constant.

In one case, at least one electronic sub-component of the pair of functionally identical electronic sub-components can include a switch.

A switch, e.g. a transistor, is a simple means by which to achieve that only one output signal of a sub-component of a pair of functionally identical electronic sub-components ever lies at the output of the electronic component.

In one case, the ID tag includes a memory for storing information.

By this means it is possible to store in the ID tag information relating to people, objects or animals for example, in order to identify or locate them. This can be done for a multiplicity of purposes, for example in access control systems, inventory management, materials management, production automation, etc.

In a development, the ID tag includes an encoder for coding information.

The encoder of the ID tag can be configured such that it can be used for time-coding and/or pulse-coding.

In one case, for a combined time and pulse coding, it is possible to transfer compactly the information stored on an ID tag to a reader. For example, the information about which data bit i.e. a first, second, third . . . data bit of an item of information is currently being transmitted can be encoded by means of a time coding i.e. a frequency modulation, while the information about the state of a data bit i.e. whether the data bit represents a "1" or a "0" can be encoded by means of a pulse coding.

In one embodiment, an electronic component, electronic sub-components e.g. a logic and/or a memory component, are operated by means of AC voltage instead of DC voltage. Flip-flop memory components can be used here as memory components. For example, an AC voltage is applied to a logic gate, whereby the AC voltage induced in an antenna coil by an electromagnetic signal can be used directly to operate the logic gate. Thus a rectifier circuit is no longer needed. A voltage limiter is provided in one case between the antenna coil and the logic gate and/or memory component, however. According to one embodiment of the invention it is possible to reduce the ratio of surface area to stored information.

In one embodiment, logic and/or memory components in a design are provided in pairs, each consisting of two functionally identical sub-components e.g. logic and/or memory components, which enables the logic and/or memory components to be operated by AC voltage, i.e. to be operated by means of AC voltage signals, where only slight changes in the components need to be made. The change essentially consists merely in providing the individual electronic components e.g. the logic components in pairs of functionally identical electronic components, where the electronic components of a pair are configured in such a way that a first electronic component of a pair provides an output signal during a first half-wave of the AC voltage, whereas the second electronic component of a pair provides an output signal during a second half-wave of the AC voltage that is shifted in phase by 180° with respect to the first half-wave.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
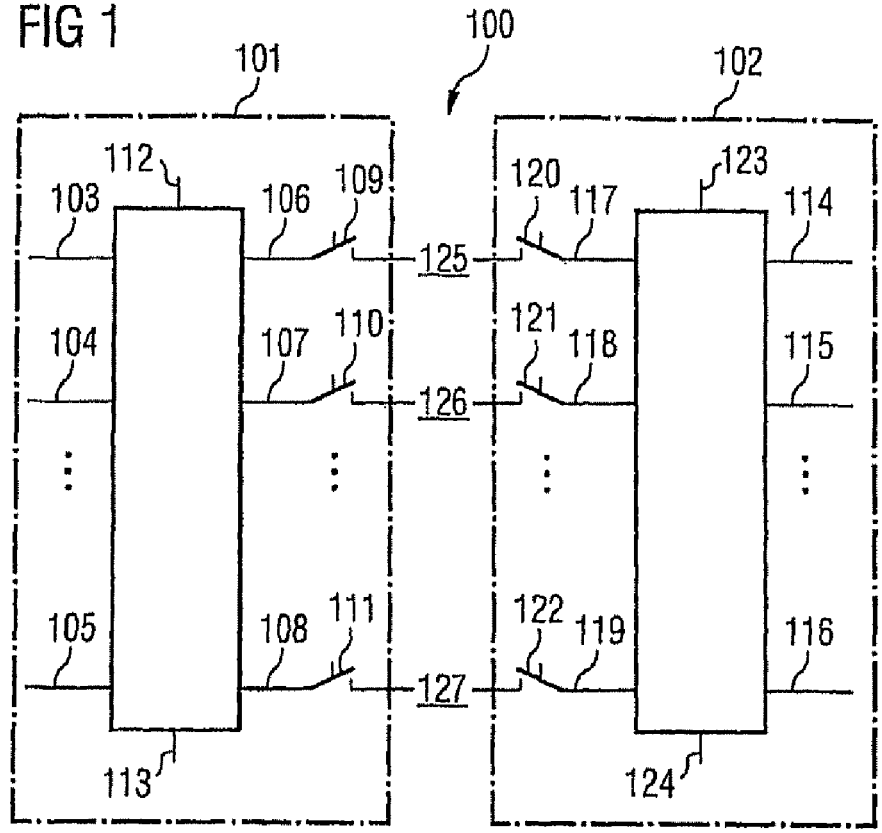
FIG. 1 illustrates a schematic diagram of part of an electronic component according to one embodiment of the invention including a pair of functionally identical sub-components.

FIG. 1 illustrates a schematic diagram of part of an electronic component 100 according to one embodiment of the invention, including a pair of functionally identical electronic sub-components. A pair of electronic sub-components, also referred to as function blocks, is illustrated schematically. A first electronic sub-component 101 of the pair includes a plurality of input terminals 103, 104 . . . 105 and a plurality of output terminals 106, 107 . . . 108. Each of the outputs is provided with a switch 109, 110 . . . 111, for example, a transistor. In addition, the terminals 112 and 113 that are used to supply an AC voltage to the first electronic sub-component 101 are illustrated schematically. Furthermore, the switches 109, 110 . . . 111 are configured such that they are operated by a first half-wave of the AC voltage, or in other words such that they switch for one polarity of the AC voltage, i.e. an output signal of the first electronic sub-component is transferred via the switches 109, 110 . . . 111 to the outputs 106, 107 . . . 108. For example, the transistors that form the switches 109, 110 . . . 111 switch when the negative phase of the AC voltage is applied to the transistors.

The second electronic sub-component 102 of the pair includes a plurality of input terminals 114, 115 . . . 116 and a plurality of output terminals 117, 118 . . . 119. Each of the outputs is provided with a switch 120, 121, 122 . . . e.g. a transistor. In addition, the terminals 123 and 124 that are used to supply an AC voltage to the second electronic sub-component 102 are illustrated schematically. Furthermore, the switches 120, 121 . . . 122 are configured such that they switch for the other polarity of the AC voltage than that of the first electronic sub-component 101, i.e. an output signal of the second electronic sub-component 102 is transferred via the switches 120, 121 . . . 122 to the outputs 117, 118 . . . 119. For example, the transistors that form the switches 120, 121 . . . 122 switch when the positive phase of the AC voltage is applied across the respective transistors, if the switches 109, 110 . . . 111 switch when the negative phase of the AC voltage is applied across the respective transistors. The corresponding outputs of the first electronic sub-component 101 and of the second electronic sub-component 102 are then connected together to form one output in each case of the electronic component 100, i.e. the two outputs 106 and 117 together form the output 125 of the electronic component, the two outputs 107 and 118 together form the output 126 of the electronic component, and the two outputs 108 and 119 together form the output 127 of the electronic component.

One should also note that the phase of the supply voltage of the second sub-component 102 is shifted by 180° with respect to the supply voltage of the first electronic sub-component 101. This means that in FIG. 1 the same phase of the AC voltage lies at the terminals 112 and 124, whereas the 180°-shifted phase of the AC voltage lies at the terminals 113 and 123. A voltage limiter (not shown) is in one case connected before the supply terminals 112, 113, 123 and 124 to prevent the electronic sub-components being destroyed by too high a voltage. In one case, this is important because the AC voltage induced in a coil depends on the change in the magnetic flux through the coil, which in turn depends, for example, on the distance between the coil and the generator of the electromagnetic field (the reader device in the case of a passive ID tag), which is difficult to keep constant in certain applications.

The formation of pairs of functionally identical electronic sub-components illustrated in FIG. 1 is a simple way of providing the capability of operating an electronic component during both half-waves of an AC voltage, where the two half-waves are phase shifted by 180°. When the AC voltage across the first electronic sub-component 101 of the pair reaches its maximum, the first electronic sub-component 101 switches and the AC voltage at the second electronic sub-component 102 of the pair reaches its minimum, and when the AC voltage across the first electronic sub-component 101 of the pair reaches its minimum, the second electronic sub-component 102, across which the AC voltage then reaches its maximum, then switches.

It helps to understand the electronic component by regarding the individual electronic sub-components as DC blocks when the amplitude between the terminals 112 and 124 or 113 and 123 respectively reaches its maximum. Then the input signals at the inputs of the electronic sub-components 101 or 102 respectively are also processed. The two electronic sub-components of a pair produce the output signals lying at the outputs for the period of one half-wave in each case. Since the two half-waves are phase shifted by 180°, the electronic switching elements can be operated without interruptions.

The two functionally identical electronic sub-components of a pair are used in parallel in order to achieve satisfactory operation of the electronic component during the two half-waves of an AC voltage. The two function blocks share the input signals, and the corresponding outputs of the two electronic sub-components are connected together after the switches e.g. transistors.

Depending on the period during which the electronic sub-components 101 and 102 can be operated as DC blocks, any known simple logic circuit such as inverters, logic gates or flip-flops can be used as function blocks. A logic circuit can also be composed of a plurality of individual logic gates such as AND-gates, OR-gates, inverters etc. The individual logic gates can be cascaded in multiple stages.

One should note, however, that in order to be able to maintain a logic state at the output during switching, the capacitance at the output must be matched to the currents flowing during the switching period. In addition, the driver capability of each individual electronic sub-component of the electronic component must be set so that a logic stage does not retain its previous states, and so that it is powerful enough to drive the next logic stage. An input capacitance of a next stage of electronic sub-components must be matched to the driver capability of the previous stage of electronic sub-components.

Figure 2:
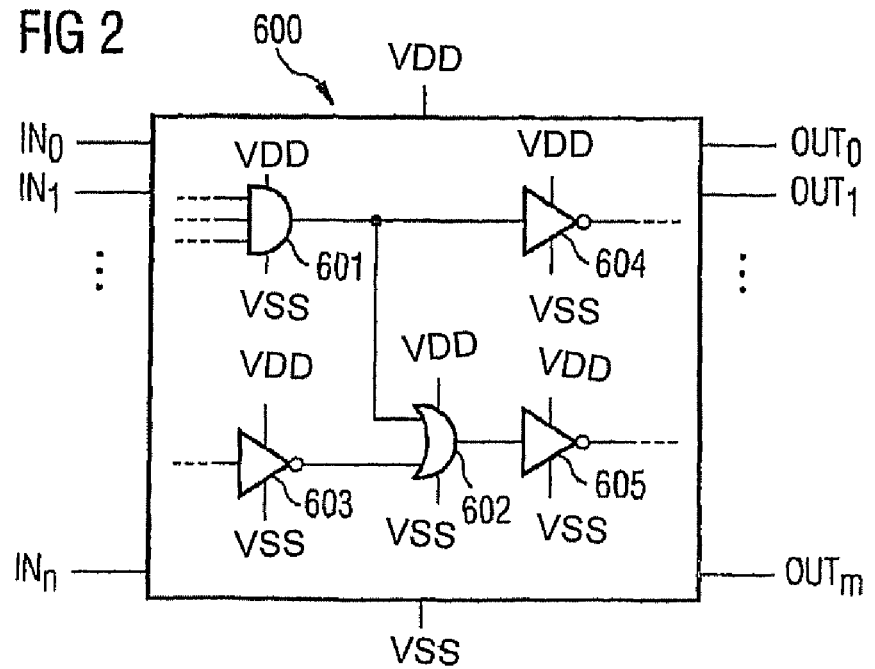
FIG. 2 illustrates a function block of an electronic sub-component as may be used in the electronic component according to one embodiment of the invention.

FIG. 2 illustrates a schematic diagram of an electronic sub-component 600 as it may be used in the electronic component as an electronic sub-component, or in other words as a function block. A function block having a plurality of inputs, an AND-gate 601, an OR-gate 602 and three inverters 603, 604, 605 is illustrated schematically as an example. In a component according to the invention, any type of logic gate, inverter and/or flip-flop can be cascaded together in one or more stages.

A simple radio frequency ID tag, referred to below as an RFID tag, is described below as an exemplary embodiment of the invention. Before looking at its design, however, a special coding technique is selected and described.

Information can be coded on an RFID tag using various techniques. In the exemplary embodiment, each bit of information is coded in a two-dimensional space i.e. in time and amplitude.

The time coding constitutes a frequency coding. When a reader for an RFID tag transmits a time varying electromagnetic radio frequency wave—the "carrier" (carrier wave), characterised by a frequency f—each bit is coded using the following principle:

the first bit, bit 0, is coded by the frequency f/2, the second bit, bit 1, is coded by the frequency f/4, the third bit, bit 2, is coded by the frequency f/8, etc.

The general coding formula is hence that the n-th bit is coded using the frequency $f/(2(2^{(n+1)}))$.

With this coding technique, there is a long period of time required to read the code, i.e. the coded information, in one case, if the code is long with respect to the carrier frequency, i.e. if many bits of information are to be transmitted using a low carrier frequency. This long period could be avoided if reading is performed in parallel, where the frequencies are combined in order to modulate them together.

Each bit can take one of two possible Boolean states labelled "0" and "1". In amplitude coding, which is used according to the exemplary embodiment, the difference between these two states is expressed by means of the difference in the power consumption in the two states, i.e. the "0" state is coded by a power consumption of $P_o$ Watts and the "1" state is coded by a power consumption of $P_1$ Watts, where $P_1=P_0+\text{diff}$, where diff>0 Watts.

By combining the two coding techniques described, it is possible to code all required data combinations. The bit number is coded by the frequency (time coded) and the bit state ("0" or "1") by the power consumption i.e. by pulse coding. Thus two different data records are coded using this technique, i.e. one data record for the bit number and one data record for the state of the bit concerned. For the reader, a spectrum of the power consumption over time can be compared with a spectrum of a resistance change over time, where the RFID tag represents a time varying resistance. This resistance can be found using the magnetic coupling rules between two coils, i.e. the reader coil and the RFID-tag coil, where a measurement is made of the currents in the reader coil induced by the presence of the RFID tag.

Figure 3:
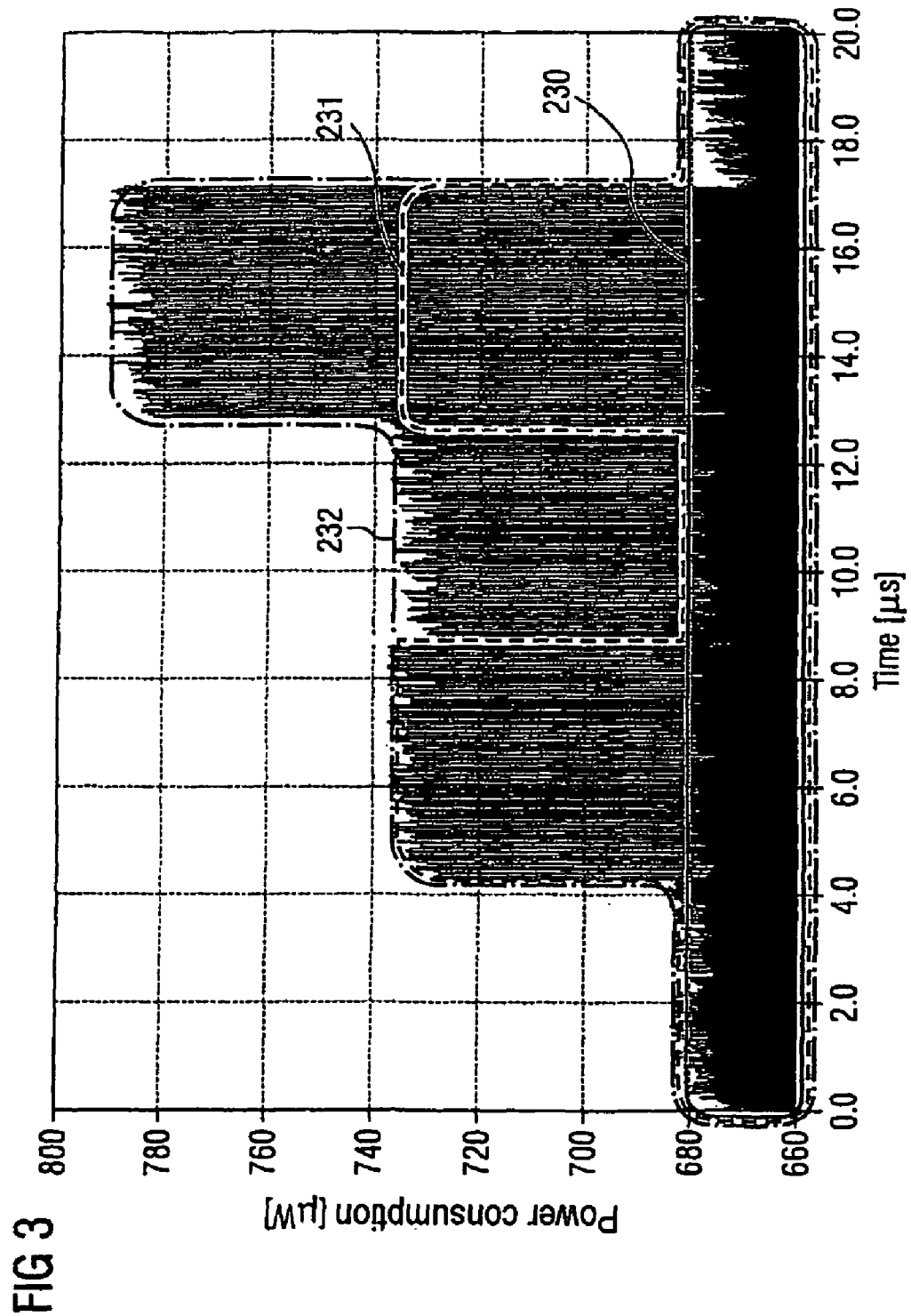
FIG. 3 illustrates results of a simulation of an 8-bit RFID tag according to one embodiment of the invention.

FIG. 3 illustrates results of a simulation of an 8-bit RFID tag according to the invention, where the information from the RFID tag has been coded using the combined coding technique described above. The x-axis (abscissa) in FIG. 3 illustrates the time axis in microseconds, while the y-axis (ordinate) illustrates the power consumption of the electronic component in units of microwatts, where the power consumption is measured across the coil terminals of the reader i.e. across the reader coil.

FIG. 3 illustrates the power consumption for three different bit configurations. The individual power consumption curves obtained for the three different bit configurations are illustrated superimposed.

In the first configuration 230, in which the power consumption equals approximately 680 microwatts, all the bits of the 8-bit RFID tag are in the "0" state. This power consumption is constant for the whole time period shown, because no bit is in the "1" state and thus there is also no additional frequency modulated load and hence no additional power consumption occurs.

In the second configuration 231, the sixth bit of the 8-bit RFID tag is in the "1" state, while the remaining bits of the 8-bit RFID tag are in the "0" state. The curve of the power consumption across the coil terminals has the following characteristic. In the time period from 0 to about 4.25 microseconds, the power consumption equals approximately 680 microwatts. The "1" state of the sixth bit has no effect within this time period. In the time period from about 4.25 to about 8.5 microseconds, the power consumption rises to approximately 735 microwatts. The additional power consumption of approximately 55 microwatts corresponds to the increased load caused by the sixth bit being in the "1" state. The power consumption again equals approximately 680 microwatts from about 8.5 to about 12.75 microseconds.

Owing to the time coding, the additional load formed by the "1" state of the sixth bit has no effect within this time period. This is because, in the combined time and pulse coding, the number of the bit is implemented using time coding, and for the time coding selected the additional power consumption of the sixth bit has no effect in this time period. From about 12.75 to 17.0 microseconds, the power consumption again rises to approximately 735 microwatts. The additional power consumption of approximately 55 microwatts again corresponds to the increased load caused by the sixth bit being in the "1" state. The additional power consumption caused by the "1" state of the sixth bit has an effect again in this time period. In the rest of the time period illustrated in the figure from about 17.0 to about 20.0 microseconds, the power consumption of the second configuration 231 once more equals approximately 580 microwatts.

In the third configuration 232, the sixth bit and the seventh bit of the 8-bit RFID tag are in the "1" state, while the remaining bits of the 8-bit RFID tag are in the "0" state. The curve of the power consumption across the coil terminals has the following characteristic. In the time period from 0 to about 4.25 microseconds, the power consumption equals approximately 680 microwatts. Neither the "1" state of the sixth bit nor the "1" state of the seventh bit have an effect within this time period, owing to the time coding. The power consumption rises to approximately 735 microwatts from about 4.25 to about 8.5 microseconds. The additional power consumption of about 55 microwatts corresponds to the increased load caused by the sixth bit being in the "1" state. The power consumption continues to equal approximately 735 microwatts from about 8.5 to about 12.75 microseconds. Owing to the time coding, the increase in the power consumption caused by the seventh bit has an effect during this time period, while the additional power consumption caused by the "1" state of the sixth bit has no effect. In the time period from about 12.75 to about 17.0 microseconds, the power consumption equals approximately 790 microwatts. Both the increase in the power consumption caused by the "1" state of the sixth bit and the increase in the power consumption caused by the "1" state of the seventh bit has an effect within this time period, owing to the time coding. In the rest of the time period illustrated in the figure from about 17.0 to about 20.0 microseconds, the power consumption of the third configuration 232 once again equals approximately 580 microwatts. Neither the "1" state of the sixth bit nor the "1" state of the seventh bit have an effect during this time period.

In order to implement the coding technique described above in an RFID tag that is robust and needs only a small surface area, a frequency divider is required for performing the time coding.

Figure 4:
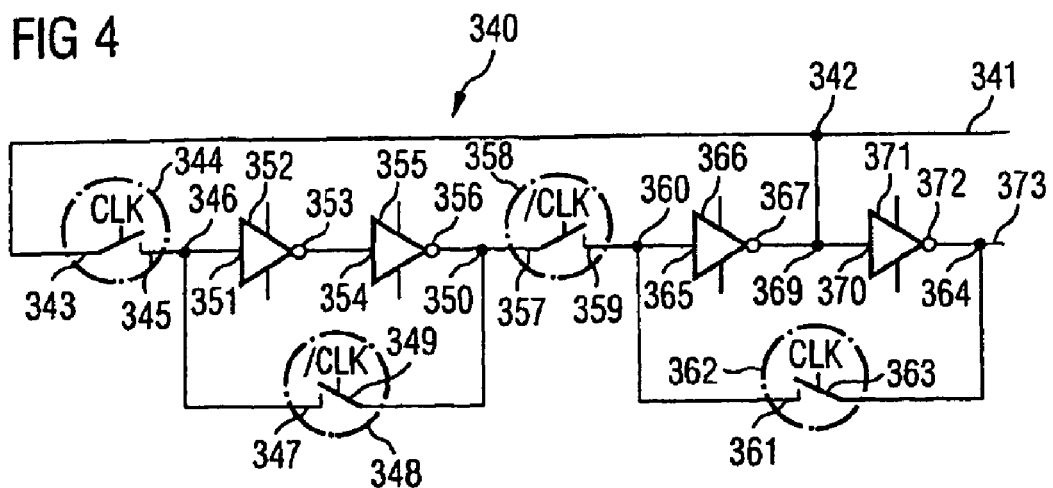
FIG. 4 illustrates a schematic diagram of a D-latch circuit.

One design of a frequency divider is based on a simple D-latch, which is a well-known and widely used electronic component. FIG. 4 illustrates a schematic diagram of a D-latch.

A D-latch 340, or rather a frequency divider, includes a first output terminal 341. The first output terminal 341 is connected to a first node 342. The first node 342 is connected to a first terminal 343 of a first Switch 344. A second terminal 345 of the first switch 344 is connected to a second node 346. The second node 346 is connected to a first terminal 347 of a second switch 348. A second terminal 349 of the second switch 348 is connected to a third node 350. The second node 346 is also connected to a first terminal 351 of a first inverter 352. A second terminal 353 of the first inverter 352 is connected to a first terminal 354 of a second inverter 355. A second terminal 356 of the second inverter 355 is connected to the third node 350.

The third node 350 is connected to a first terminal 357 of a third switch 358. A second terminal 359 of the third switch 358 is connected to a fourth node 360. The fourth node 360 is connected to a first terminal 361 of a fourth switch 362. A second terminal 363 of the fourth switch 362 is connected to a fifth node 364. The fourth node 360 is connected to a first terminal 365 of a third inverter 366. A second terminal 367 of the third inverter 366 is connected to a sixth node 369. The sixth node 369 is connected to a first terminal 370 of a fourth inverter 371. A second terminal 372 of the fourth inverter 371 is connected to the fifth node 364. The sixth node 369 is also connected to the first node 342. The fifth node 364 is also connected to a second output terminal 373 of the D-latch. The first, second, third and fourth inverter are each supplied by AC voltages VDD and VSS.

When a first clock signal CLK is applied to the first and fourth switch, a second clock signal \CLK is applied to the second and third switch, the two clock signals being differential to each other. This means that when the first and fourth switch are open i.e. the clock signal \CLK is applied to them, the second and third switches are closed i.e. a clock signal CLK is applied, and vice versa. The switches may be designed as transistors for example, where the first and second terminal then correspond to a first and second source/drain terminal respectively, and the clock signal is applied to the gate of the respective transistor.

FIGS. 5A-5E illustrates how a D-latch of FIG. 4 works as a frequency divider.

Figure 5A:
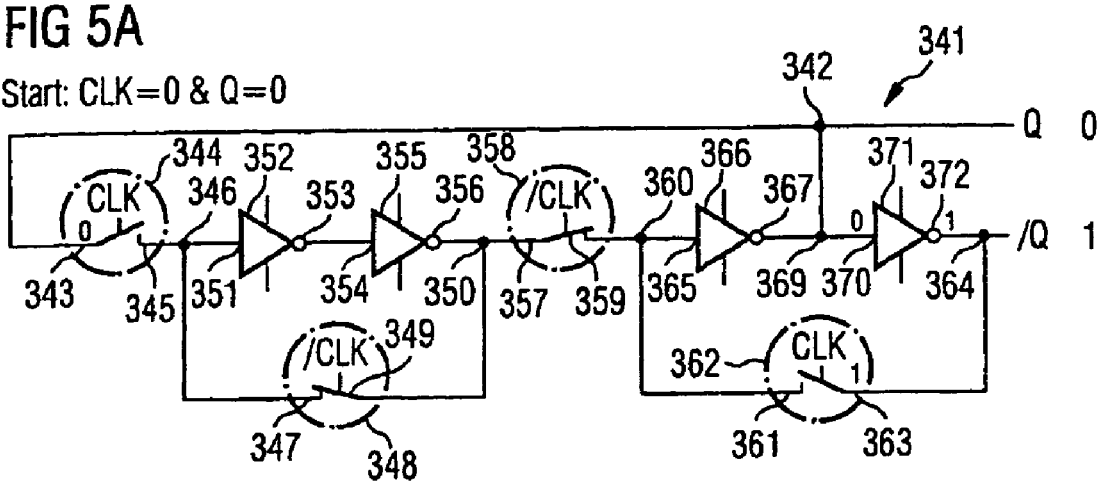
FIGS. 5A-5E illustrate a schematic diagram of a frequency divider, as may be used in an electronic component according to one embodiment of the invention.

FIG. 5A illustrates the frequency divider of FIG. 4 in its initial state. The initial state was chosen as a state in which the clock signal CLK corresponds to a "0" state i.e. there is no clock signal at the first and the fourth switch and these are open, and in which the "0" state lies at the first output terminal 341. This means that the second and third switches are closed. It also means that there is a "0" at the first terminal 342 of the first switch 343, at the first node 341, at the sixth node 369 and hence at the first terminal 370 of the fourth inverter 371. This results in a "1" at the second terminal 372 of the fourth inverter 371, at the fifth node 364 and at the second terminal 363 of the fourth switch 362. Hence a "1" also lies at the second output terminal 373 of the frequency divider.

Figure 5B:
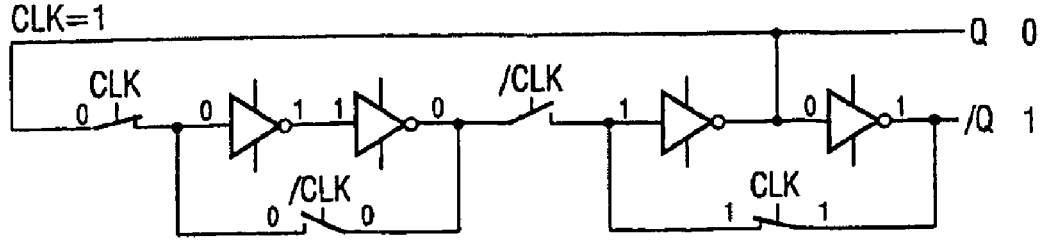

FIG. 5B illustrates the frequency divider of FIG. 5A in a state one half clock period later i.e. the clock signal CLK is in a "1" state. Hence there is a clock signal at the first and the fourth switch and these are closed, whereas there is no clock signal at the second and the third switch and these are open. This results in the following state for the frequency divider of FIG. 5B.

At the first switch 344, there is a "0" state at both terminals, hence this "0" state also lies at the second node 346, at the first terminal 347 of the second switch 348 and at the first terminal 351 of the first inverter 352. Hence there is a "1" state both at the second terminal 353 of the first inverter 352 and at the first terminal 354 of the second inverter 355. Thus a "0" state lies at the second terminal 356 of the second inverter 355, at the third node 350, at the second terminal 349 of the second switch 348 and at the first terminal 357 of the third switch 358.

There continues to be a "0" state at the first output terminal 341 of the frequency divider 340, the first node 342, the sixth node 369, the first terminal 370 of the fourth inverter 371 and the second terminal 367 of the third inverter 366. Hence a "1" state lies at the second terminal 372 of the fourth inverter 371, the fifth node 364, the second output terminal 373 of the frequency inverter, the two terminals of the fourth switch 362, the second terminal 359 of the third switch 358 of the fourth node 360 and at the first terminal 365 of the third inverter 366.

Figure 5C:
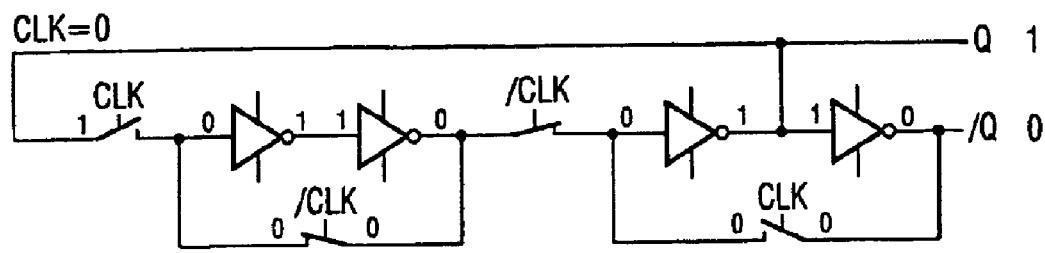

FIG. 5C illustrates the frequency divider of FIG. 5B in a state one half clock period later i.e. the clock signal CLK is in a "0" state. Hence there is no clock signal at the first and the fourth switch and these are open, whereas there is a clock signal at the second and the third switch and these are closed. This results in the following state for the frequency divider of FIG. 5C.

At the first terminal 343 of the first switch 344 there is a "1" state, whereas there is a "0" state at the second terminal 345 of the second switch 344. Hence this "0" state also lies at the second node 346, at the first terminal 347 of the second switch 348 and at the first terminal 351 of the first inverter 352. Hence there is a "1" state both at the second terminal 353 of the first inverter 352 and the first terminal 354 of the second inverter 355. Thus a "0" state lies at the second terminal 356 of the second inverter 355, at the third node 350, at the second terminal 349 of the second switch 348 and at the first terminal 357 of the third switch 358.

A "1" state now lies at the first output terminal 341 of the frequency divider 340, the first node 342, the sixth node 369, the first terminal 370 of the fourth inverter 371 and the second terminal 367 of the third inverter 366. Hence a "0" state lies at the second terminal 372 of the fourth inverter 371, the fifth node 364, the second output terminal 373 of the frequency divider, the two terminals of the fourth switch 362, the second terminal 359 of the third switch 358, the fourth node 360 and at the first terminal 365 of the third inverter 366.

Figure 5D:
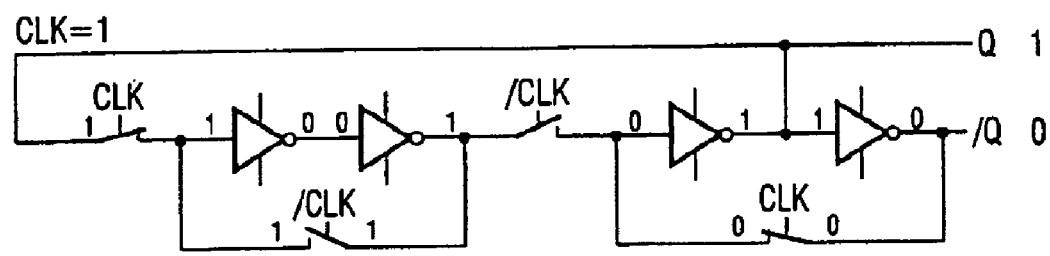

FIG. 5D illustrates the frequency divider of FIG. 5C in a state one half clock period later i.e. the clock signal CLK is in a "1" state. Hence there is a clock signal at the first and the fourth switch and these are closed, whereas there is no clock signal at the second and the third switch and these are open. This results in the following state for the frequency divider of FIG. 5D.

There is a "1" state at both terminals of the first switch 344, hence this "1" state also lies at the second node 346, at the first terminal 347 of the second switch 348 and at the first terminal 351 of the first inverter 352. Thus there is a "0" state both at the second terminal 353 of the first inverter 352 and at the first terminal 354 of the second inverter 355. Hence there is a "1" state at the second terminal 356 of the second inverter 355, at the third node 350, at the second terminal 349 of the second switch 348 and at the first terminal 357 of the third switch 358.

There continues to be a "1" state at the first output terminal 341 of the frequency divider 340, the first node 342, the sixth node 369, the first terminal 370 of the fourth inverter 371 and the second terminal 367 of the third inverter 366. Thus a "0" state lies at the second terminal 372 of the fourth inverter 371, the fifth node 364, the second output terminal 373 of the frequency divider, the two terminals of the fourth switch 362, the second terminal 359 of the third switch 358, the fourth node 360 and at the first terminal 365 of the third inverter 366.

Figure 5E:
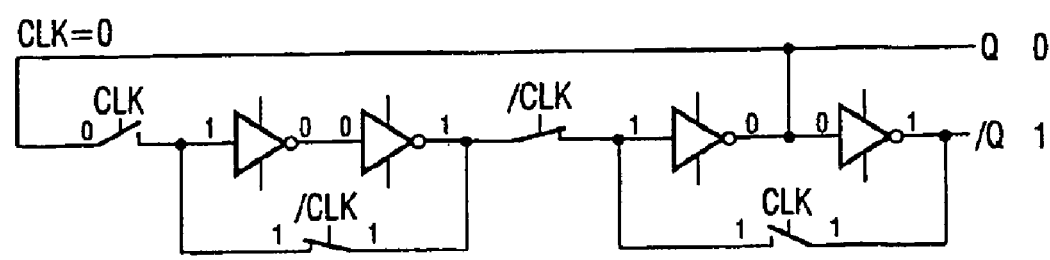

FIG. 5E illustrates the frequency divider of FIG. 5D in a state one half clock period later i.e. the clock signal CLK is in a "0" state. Hence there is no clock signal at the first and the fourth switch and these are open, whereas there is a clock signal at the second and the third switch and these are closed. This results in the following state for the frequency divider of FIG. 5E.

At the first terminal 343 of the first switch 344 there is a "0" state, whereas there is a "1" state at the second terminal 345 of the second switch 344. Hence this "1" state also lies at the second node 346, at the first terminal 347 of the second switch 348 and at the first terminal 351 of the first inverter 352. Hence there is a "0" state both at the second terminal 353 of the first inverter 352 and the first terminal 354 of the second inverter 355. Thus a "1" state lies at the second terminal 356 of the second inverter 355, at the third node 350, at the second terminal 349 of the second switch 348 and at the first terminal 357 of the third switch 358.

A "0" state now lies at the first output terminal 341 of the frequency divider 340, the first node 342, the sixth node 369, the first terminal 370 of the fourth inverter 371 and the second terminal 367 of the third inverter 366. Hence a "1" state lies at the second terminal 372 of the fourth inverter 371, the fifth node 364, the second output terminal 373 of the frequency divider, the two terminals of the fourth switch 362, the second terminal 359 of the third switch 358, the fourth node 360 and at the first terminal 365 of the third inverter 366.

Hence it can be seen that the D-latch of FIGS. 5A-5E can be used as a frequency divider. When a clock signal of input frequency f is used for the switches, this results in the output frequency at the output terminals 341 and 373 of f/2.

Such frequency dividers can be cascaded in chains, in order to generate all the frequencies in the sequence $f/(2^{(n+1)})$ that are required for the time coding of the combined coding technique described above. To do this, the first output terminal 341 is connected to the clock input of the subsequent stage. By this means it is possible to generate a frequency series of $f/(2^{(n+1)})$, which can be tapped at the first outputs 341 of the corresponding stages of each of the frequency dividers. Each output terminal $Q_n$ of a frequency divider stage n is either connected to a load or not connected to a load, in order to either increase or not increase the global power consumption and hence enable execution of an amplitude coding of the data bits of the information stored on the RFID TAG. Hence the combined coding described above can be carried out by the frequency divider illustrated in FIGS. 5A-5E.

The D-latch explained with reference to FIGS. 5A-5E uses DC voltages applied to the inverter as VDD and VSS. As already explained, however, the antenna coil of an RFID tag generates an AC voltage. Hence the latch, or rather the frequency divider, of FIGS. 5A-5E must be adapted so that it can be operated using AC voltage. This is explained with reference to FIG. 6.

Figure 6:
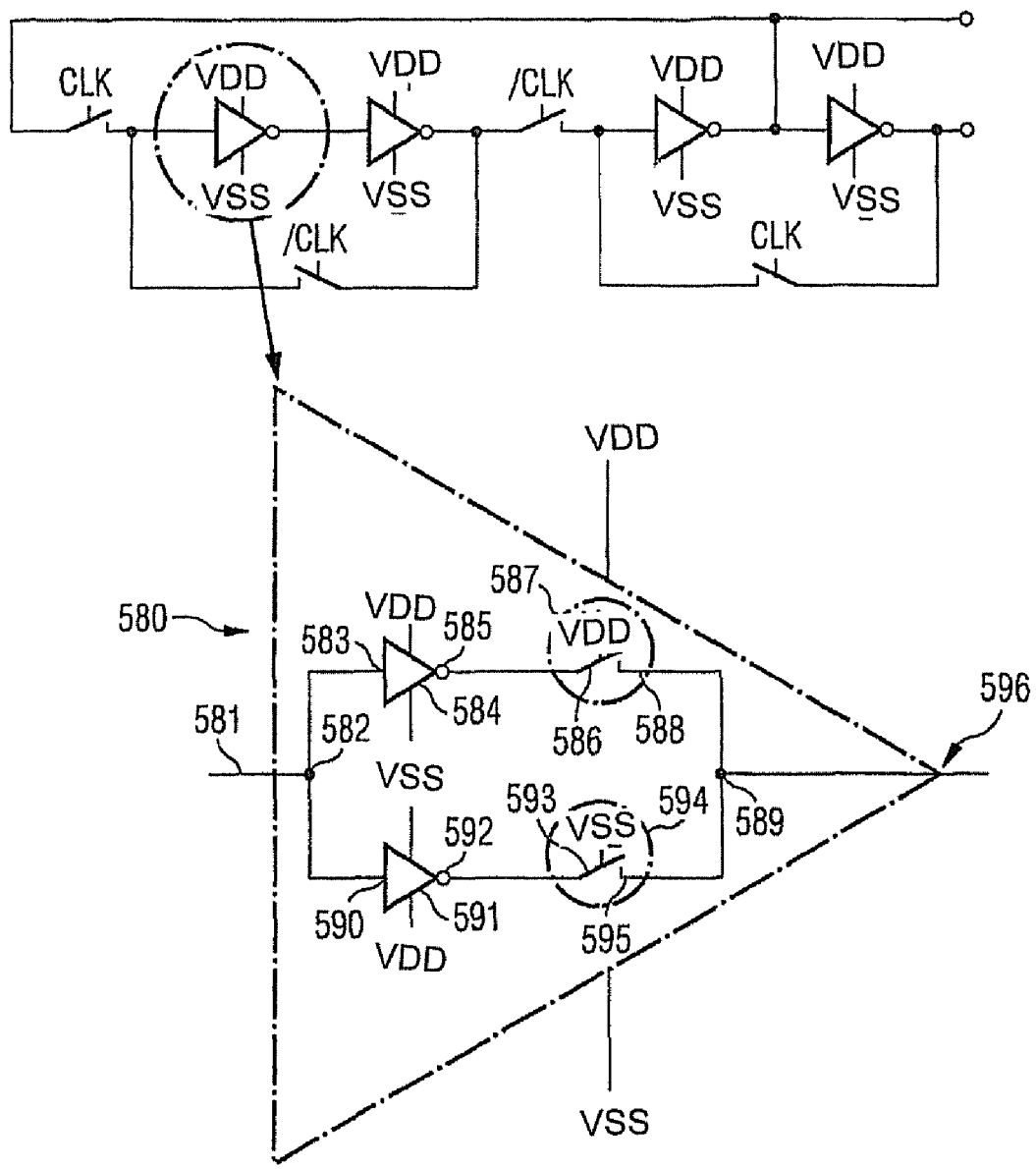
FIG. 6 illustrates a detailed diagram of an inverter according to one embodiment of the invention of a frequency divider that can be used in an electronic component according to the invention.

FIG. 6 illustrates how the inverter of a frequency divider needs to be changed so that it can be operated using AC voltage. FIG. 6 illustrates a detail from the design of an inverter of FIGS. 5A-5E. The idea behind this, is that a pair of functionally identical inverters is used instead of a single inverter. This is illustrated in FIG. 6.

An inverter 580 according to one embodiment of the invention includes an input terminal 581. The input terminal 581 is connected to a first node 582. The first node 582 is connected to a first input 583 of a first traditional inverter 584. A first output 585 of the first traditional inverter 584 is connected to a first terminal 586 of a first switch 587. A second terminal 588 of the first switch 587 is connected to a second node 589.

In addition, the first node 582 is connected to a first terminal 590 of a second traditional inverter 591. A first terminal 592 of the second traditional inverter 591 is connected to a first terminal 593 of a second switch 594. A second terminal 595 of the second switch 594 is connected to the second node 589. The second node 589 is connected to an output terminal 596 of the inverter according to one embodiment of the invention.

An AC voltage is connected to the first and second traditional inverters as the supply voltage. The AC voltage is applied here to the inverters so that the first traditional inverter 584 is operated in a first half-wave, i.e. with a first polarity, of the AC voltage, whereas the second traditional inverter 591 is operated with the second half-wave, i.e. with a second polarity, of the AC voltage. In addition, the first switch 587 is switched by the first half-wave of the AC voltage, whereas the second switch 594 is switched by the second half-wave of the AC voltage. Transistors can be used as the first and second switch. In this case, the first and second terminal of the first and second switch constitute first and second source/drain terminals respectively, and the AC voltage is applied to the gates of the transistors in order to switch them.

Hence the inverter according to one embodiment of the invention of FIG. 6 can be operated by an AC voltage. It provides an output signal during both half-waves of an AC voltage.

The first traditional inverter 584 and the first switch 587 constitute a first functional block, which is an example of a first electronic sub-component of a pair of functionally identical electronic sub-components as is illustrated in FIG. 1.

The second traditional inverter 591 and the second switch 594 constitute a second functional block, which is an example of the second electronic sub-component of the pair of functionally identical electronic sub-components as is illustrated in FIG. 1.

To illustrate, the frequency divider of FIGS. 5A-5E is illustrated again in FIG. 6 above the inverter just described according to one embodiment of the invention. An inverter according to one embodiment of the invention can be used as each inverter in the frequency divider of FIGS. 5A-5E, in order to create a frequency divider according to one embodiment of the invention that can be operated by an AC voltage.

The inverter according to one embodiment of the invention illustrated in FIG. 6 is to be seen merely as an example of a pair of electronic sub-components. Any known logic and memory components such as AND-gates, OR-gates, NOR-gates, NAND-gates, EXOR-gates, inverters, flip-flops etc., and combinations in a single stage or cascaded in a plurality of stages can be used as a functional block as illustrated schematically in FIG. 1, in order to build an electronic component according embodiments of to the invention. In one embodiment, in order to enable operation using AC voltage, the individual electronic sub-components are provided as pairs of functionally identical electronic sub-components, of which one sub-component of the pair is operated in a first half-wave of the AC voltage, whereas the second sub-component of the pair is operated in the second half-wave of the AC voltage.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An electronic component operable with an AC voltage, the electric component comprising:
    at least one input;
    at least one output; and
    a pair of functionally identical electronic sub-components, wherein the functionally identical electronic sub-components are connected in parallel;
    wherein the at least one input of the electronic component is connected to a respective input of the two functionally identical electronic sub-components;
    wherein the at least one output of the electronic component is connected to a respective output of the two functionally identical electronic sub-components; and
    wherein the electronic component is configured such that at the at least one output only one output signal of a first sub-component of the pair of functionally identical electronic sub-components can be picked up during a first half-wave of an AC voltage, whereas only one output signal of the second sub-component of the pair of functionally identical electronic sub-components can be picked up during a second half-wave of the AC voltage.

2. The electronic component of claim 1 further comprising a plurality of pairs of functionally identical electronic sub-components.

3. The electronic component of claim 1, wherein at least one pair of functionally identical electronic sub-components comprises one of logic-gates, inverters and flip-flops.

4. The electronic component of claim 1, wherein the electronic component comprises a coil.

5. The electronic component of claim 1 further comprising a voltage limiter, which limits the AC voltage lying across an electronic sub-component of the pair of functionally identical electronic sub-components.

6. The electronic component of claim 1, wherein the electronic sub-components of a pair of functionally identical electronic sub-components comprises a switch.

7. The electronic component of claim 1, wherein the electronic component is configured within an ID tag.

8. The electronic component of claim 7, wherein the ID tag comprises a memory for storing information.

9. The electronic component of claim 7, wherein the ID tag comprises an encoder for coding information.

10. The electronic component of claim 9, wherein the encoder is configured such that it can be used for time-coding and pulse-coding.

11. An electronic arrangement comprising:
a read device;
an ID tag with an electric component comprising:
a first sub-component with an input and an output;
a second sub-component with an input and an output, wherein the first and the second sub-component are connected in parallel;
an AC signal received by the inputs of the first and second sub-components, the AC signal having a first half-wave and a second half-wave;
means for providing an output from only the first sub-component during the first half-wave; and
means for providing an output from only the second sub-component during the second half-wave;
wherein the ID tag and read device are configured to communicate with each other without contact.

12. The electronic arrangement of claim 11, wherein the first and second sub-components are functionally substantially similar.

13. The electronic arrangement of claim 12, wherein the electronic component further comprises a plurality of pairs of functionally identical electronic sub-components.

14. The electronic arrangement of claim 12, wherein at least one pair of functionally identical electronic sub-components comprises one of logic-gates, inverters and flip-flops.

15. The electronic arrangement of claim 12, wherein the electronic component comprises a coil.

16. The electronic arrangement of claim 12, wherein the electronic component further comprises a voltage limiter, which limits the AC voltage lying across an electronic sub-component of the pair of functionally identical electronic sub-components.

17. The electronic arrangement of claim 12, wherein the electronic sub-component comprises a switch.

18. The electronic arrangement of claim 12, wherein the ID tag comprises a memory for storing information.

19. The electronic arrangement of claim 18, wherein the ID tag comprises an encoder for coding information.

20. The electronic arrangement of claim 19, wherein the encoder is configured such that it can be used for time-coding and pulse-coding.

21. An electronic component operable with an AC voltage, the electric component comprising:
at least one input;
at least one output; and
a pair of functionally identical electronic sub-components, wherein the functionally identical electronic sub-components are identically oriented and connected in parallel;
wherein the at least one input of the electronic component is connected to a respective input of the two functionally identical electronic sub-components;
wherein the at least one output of the electronic component is connected to a respective output of the two functionally identical electronic sub-components; and
wherein the electronic component is configured such that at the at least one output only one output signal of a first sub-component of the pair of functionally identical electronic sub-components can be picked up during a first half-wave of an AC voltage, whereas only one output signal of the second sub-component of the pair of functionally identical electronic sub-components can be picked up during a second half-wave of the AC voltage.

* * * * *